United States Patent
Paust et al.

(10) Patent No.: US 9,512,943 B2
(45) Date of Patent: Dec. 6, 2016

(54) CONNECTING ARRANGEMENT FOR CONNECTING A FLUID LINE TO AN ASSEMBLY TO BE SUPPLIED WITH FLUID

(71) Applicant: ContiTech Techno-Chemie GmbH, Karben (DE)

(72) Inventors: Marcus Paust, Nidderau (DE); Michael Hahn, Ramberg (DE); Juergen Foik, Bad Homburg (DE)

(73) Assignee: ContiTech Techno-Chemie GmbH, Karben (DE)

( * ) Notice: Subject to any disclaimer, the term of this patent is extended or adjusted under 35 U.S.C. 154(b) by 150 days.

(21) Appl. No.: 14/013,977

(22) Filed: Aug. 29, 2013

(65) Prior Publication Data

US 2014/0001750 A1  Jan. 2, 2014

Related U.S. Application Data

(63) Continuation of application No. PCT/EP2012/052159, filed on Feb. 9, 2012.

(30) Foreign Application Priority Data

Mar. 1, 2011  (DE) .................. 10 2011 000 982

(51) Int. Cl.
  *F16L 13/08* (2006.01)
  *F16L 23/026* (2006.01)
(52) U.S. Cl.
  CPC .............. *F16L 13/08* (2013.01); *F16L 23/026* (2013.01)
(58) Field of Classification Search
  CPC ........ F16L 41/082; F16L 41/084; F16L 13/08; F16L 23/026

USPC ......................................................... 285/416
See application file for complete search history.

(56) References Cited

U.S. PATENT DOCUMENTS

| | | | | |
|---|---|---|---|---|
| 2,496,677 A | * | 2/1950 | Reedy | 285/189 |
| 4,770,447 A | * | 9/1988 | Umehara | 285/189 |
| 4,832,383 A | | 5/1989 | Roussel | |
| 5,018,769 A | | 5/1991 | Albrecht | |
| 5,333,918 A | * | 8/1994 | Crout et al. | 285/288.1 |
| 5,380,048 A | * | 1/1995 | Vogel | 285/22 |
| 2004/0207200 A1 | * | 10/2004 | Baxi et al. | 285/205 |

(Continued)

FOREIGN PATENT DOCUMENTS

| | | |
|---|---|---|
| DE | 10 2007 051 109 A1 | 4/2008 |
| EP | 1 712 826 A1 | 10/2006 |

(Continued)

OTHER PUBLICATIONS

International Search Report dated Sep. 12, 2012 of international application PCT/EP2012/052159 on which this application is based.

*Primary Examiner* — James Hewitt
(74) *Attorney, Agent, or Firm* — Walter Ottesen, P.A.

(57) ABSTRACT

A connecting arrangement connects an end of a fluid conduit to an assembly. The connecting arrangement includes a stub (1) having a flow opening (11) for receiving the fluid conduit at one end of the flow opening (11) as well as a flange (2) having a first opening (9) for receiving the stub (1) and a second opening (10) for fastening to the assembly. The stub (1) is inserted into the first opening (9) and connected to the flange (2) in a material-to-material manner. The flange (2) has in the region of the connection a groove (4) that extends in a circumferential direction.

6 Claims, 1 Drawing Sheet

FIG. 3

(56) References Cited

U.S. PATENT DOCUMENTS

2006/0119099 A1* 6/2006 Chiba et al. ............... 285/124.3
2011/0114216 A1* 5/2011 Blueml et al. ................ 138/155
2012/0223519 A1* 9/2012 Yamamoto ................... 285/179

FOREIGN PATENT DOCUMENTS

| EP | 2474767 A1 * | 7/2012 |
| GB | 870886 * | 6/1961 |
| JP | 7-103374 A | 4/1995 |

* cited by examiner

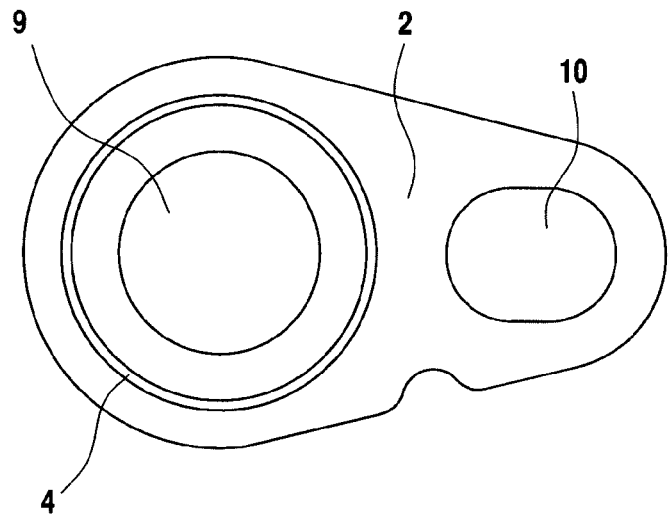
FIG. 1
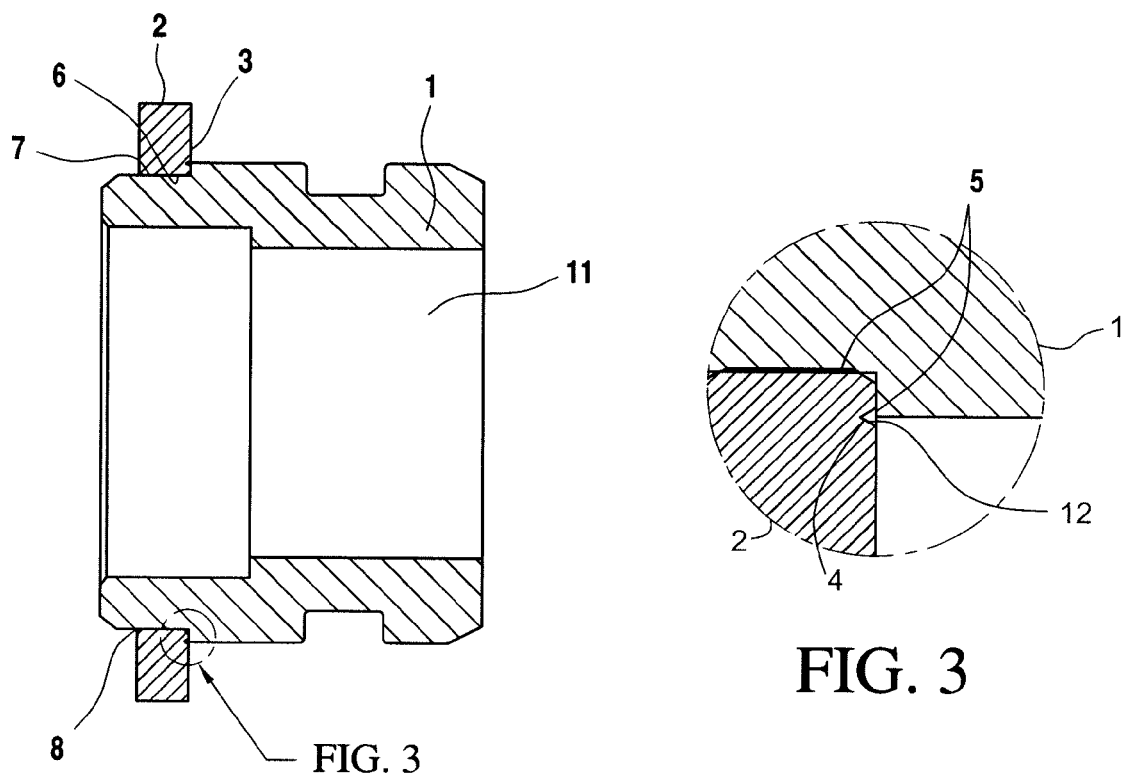
FIG. 3
FIG. 2

US 9,512,943 B2

CONNECTING ARRANGEMENT FOR CONNECTING A FLUID LINE TO AN ASSEMBLY TO BE SUPPLIED WITH FLUID

CROSS REFERENCE TO RELATED APPLICATIONS

This application is a continuation application of international patent application PCT/EP2012/052159, filed Feb. 9, 2012, designating the United States and claiming priority from German application 10 2011 000 982.5, filed Mar. 1, 2011, and the entire content of both applications is incorporated herein by reference.

FIELD OF THE INVENTION

The invention relates to a connecting arrangement for connecting an end of a fluid line to an assembly, in particular a motor vehicle assembly, which has a throughflow opening and is to be supplied with fluid.

BACKGROUND OF THE INVENTION

In motor vehicles, pipes, hoses and lines are used for guiding various fluids between the individual assemblies of the engine. In order to connect the lines to the assemblies, connecting arrangements are used which can have, for example, a stub and a flange which are connected to one another in a material-to-material manner, for example, via a soldered connection.

The requirement is often made of a connecting arrangement of this type that the plug-in region of stub and flange is to be free from solder residues or solder accumulations. This is often avoided by the use of special solder resist agents or complicated constructions which avoid the transfer from stub to flange in the plug-in region. A further cost-intensive method is the removal of solder residues via material-removing postmachining.

It is disadvantageous here that these measures cause costs, for example, as a result of the material use of the solder resist agents and/or the time required therefor.

SUMMARY OF THE INVENTION

It is an object of the invention to provide a connecting arrangement which avoids the solder residues or solder accumulations in a simpler way than the known measures.

The connecting arrangement of the invention is for connecting an end of a fluid line to an assembly to be supplied with fluid. The connecting arrangement includes: a stub having a throughflow opening configured to receive the fluid line at one end thereof; a flange defining a first opening configured to receive the stub and a second opening configured for fixing the flange on the assembly; the stub being disposed inserted into the first opening of the flange and being connected thereto material-to-material in a firmly bonded manner via a solder connection; and, the flange having a groove extending in a circumferential direction in the region whereat the stub is connected to the flange in the firmly bonded manner.

The invention is based on the finding that, as has been shown in practice, regardless of the soldering process which is used, the solder results are subject to fluctuations (not completely soldered or excess of solder) on account of the stated influencing variables. As a result of the depression of the flange which is preferably formed as an embossed groove in the flange, the solder no longer runs onto the flange in an undefined manner during soldering. Excess solder is collected in the groove and no longer flows out of the latter on account of the geometry of the groove. Here, the capillary action breaks down in the groove.

The depression therefore leads to the plug-in region of the flange remaining free from solder. Moreover, a positive effect is achieved to the extent that substantially less excess solder runs onto the plug-in region of the stub. This can be prevented completely by additional introduction of a channel into the stub.

In addition, the soldering process is optimized to the extent that the number of joining partners which are not soldered completely, that is stubs and flanges, can be reduced considerably, since more solder and a longer soldering time during the soldering process can be used correspondingly on account of the groove.

This configuration represents an inexpensive alternative to the known measures, which alternative at the same time, by way of the use of a groove in the flange, prevents the solder moving onto the plug-in region of the flange.

In order to make the connecting arrangement, first of all the stub is fixed with the flange via an interference fit. The interference fit is necessary, in order to correctly orient the parts for the following soldering process.

In the next step, the individual parts are joined in a material-to-material manner by means of soldering. Various soldering processes are available for this purpose. The parts can be joined in a material-to-material manner either via furnace soldering or induction soldering. In principle, in all soldering processes, the solder can be supplied in paste form pre-coated onto the individual components or as a solid.

BRIEF DESCRIPTION OF THE DRAWINGS

The invention will now be described with reference to the drawings wherein:

FIG. 1 is a schematic plan view of a flange;

FIG. 2 shows a section through the flange and the stub; and,

FIG. 3 is an enlarged view of the detail circled in FIG. 2.

DESCRIPTION OF THE PREFERRED EMBODIMENTS OF THE INVENTION

FIG. 1 shows a schematic plan view of a flange 2. The flange 2 has a first opening 9 for receiving a stub 1 (see FIG. 2). Correspondingly, the internal diameter of the first opening 9 (inner bore 6, see FIG. 2) is at least slightly radially larger (joining diameter 7, see FIG. 2) than the external diameter of the stub 1 in the region 3, in which the flange 2 is to be plugged onto the stub 1 (plug-in region 3).

Furthermore, the flange 2 has a second opening 10. Via the second opening 10, the flange 2 and therefore also the entire mounting device can be screwed, for example, to an assembly, in order to produce a fixed and fluid-tight connection between the assembly and a fluid line.

According to the invention, the flange 2 has a flat surface and a depression 4 formed in the flat surface. The depression is preferably configured as an embossed groove 4. The groove 4 runs radially around the first opening 9 on a surface of the flange 2. The groove 4 is configured and arranged on the flange 2 in such a way that solder can collect in the groove 4 when the flange 2 and the stub 1 are connected via soldering. Thus, as shown in FIG. 3, the stub has a flat surface in surface-to-surface contact with the flat surface of the flange and partly covers the groove 4 along the circumferential length thereof so as to leave an exposed annular gap 12.

FIG. 2 shows a section through the flange 2 and the stub 1. Here, the flange 2 is plugged onto the stub 1 in the plug-in region 3 and is connected to the stub 1 in a material-to-material manner via soldering 5, see also enlarged detail of position 8 of FIG. 3.

The making of the connection between the flange 2 and the stub 1 can be carried out as follows:

In the first step, the stub 1 and the flange 2 are pre-joined via pressing processes. To this end, the flange 2 is fixed in the region of the inner bore 6 onto the joining diameter 7 of the stub by way of a press.

In the second step, the joining partners (1, 2) are joined in a material-to-material manner by the soldering process. On account of the requirement that the plug-in region 3 has to be free from solder residues and solder accumulations, it is not possible to supply solder in the plug-in region or to apply it by pre-coating, see detail of FIG. 3. This would necessarily lead to solder residues in the plug-in region. The application of the solder is therefore necessarily to be carried out on the side 6 which faces away from the plug-in region 3.

Furnace soldering and induction soldering, for example, are soldering processes which will be described in general below.

During classic furnace soldering, the joining partners (1, 2) are soldered under a protective gas atmosphere. Here, the soldering temperature is dependent on the soldering material which is used. The soldering time is dependent on the volume, geometry, mass and the soldering material which is used. Here, the solder is applied by means of paste or solid solder (ring) at position 8.

Generally, solder paste is used in this construction in combination with furnace soldering. The coating with solder paste takes place by way of a pneumatic metering unit or by a feed-screw metering unit. Subsequently, the joining partners (1, 2) are deposited onto a chain conveyor belt at the start of the furnace. The chain conveyor belt moves the two joining partners (1, 2) at a defined belt speed through the various heating and cooling zones of the furnace. The joining partners are joined in a material-to-material manner in the heating zones and are subsequently cooled in a cooling tunnel. At the end of the furnace, the soldered components can be removed from the chain conveyor belt.

As a result of process influencing variables such as soldering time, volume, geometry and quantity of the soldering material which is used, it can occur that the joining partners are not completely soldered, are soldered in an optimum manner, or are soldered in an optimum manner wherein excess solder has been deposited in an undefined manner on the plug-in region of the stub 1 or on the flange 2.

In induction soldering, the joining partners (1, 2) are soldered under a protective gas atmosphere. Here, the soldering temperature is dependent on the soldering material which is used. The soldering time is dependent on the volume, geometry, mass and the soldering material which is used. Here, the solder is applied by means of paste or solid solder (wire) at position 8.

The coating with paste takes place by way of a pneumatic metering unit or by a feed-screw metering unit. The feeding of the solid solder takes place either via a wire feed means or can be fed as a shaped solder part (soldering ring). In induction soldering, the pre-joined joining partners (1, 2) are inserted into corresponding receptacles (device). Here, the joining partners (1, 2) are joined in a material-to-material manner by means of induction heating. After the heating (soldering), the joining partners (1, 2) are cooled by means of protective gas and can be removed from the receptacle (device).

On account of the process influencing variables such as soldering time, volume, geometry and quantity of the soldering material which is used, it can occur that the joining partners are not completely soldered, are soldered in an optimum manner, or are soldered in an optimum manner wherein excess solder has been deposited in an undefined manner on the plug-in region of the stub 1 or on the flange 2.

It is understood that the foregoing description is that of the preferred embodiments of the invention and that various changes and modifications may be made thereto without departing from the spirit and scope of the invention as defined in the appended claims.

List of Designations
(Part of the Description)
1 Stub
2 Flange
3 Plug-in region
4 Groove
5 Soldering
6 Inner bore
7 Joining diameter
8 Position
9 First opening of the flange 2 for receiving the stub 1
10 Second opening of the flange 2 for fastening to the assembly
11 Through opening of the stub 1
12 Annular gap

What is claimed is:

1. A connecting arrangement for connecting an end of a fluid line to an assembly to be supplied with fluid, the connecting arrangement comprising:
   a stub having a throughflow opening configured to receive the fluid line at one end thereof;
   a flange defining a first opening configured to receive said stub therein and conjointly defining an interference fit therewith and a second opening configured for fixing said flange on the assembly;
   said stub being inserted into said first opening of said flange and being connected thereto material-to-material in a firmly bonded manner via a solder connection;
   said flange having a flat surface and an annular groove formed in said flat surface and spaced radially outwardly from said first opening and so as to extend in a circumferential direction in the region whereat said stub is connected to said flange in said firmly bonded manner;
   said stub having a flat surface in surface-to-surface contact with said flat surface of said flange so as to define an interface therebetween; and,
   said groove being formed at said interface to collect excess solder therein and said groove being configured to break down a capillary action of said excess solder thereby preventing a flow of said excess solder from said groove.

2. The connecting arrangement of claim 1, wherein the assembly is a motor vehicle assembly.

3. The connecting arrangement of claim 1, wherein said flat surface of said stub is in contact with said flat surface of said flange so as to partly cover over said groove along the circumferential length thereof so as to leave an exposed annular gap.

4. The connecting arrangement of claim 3, wherein said groove is formed entirely in said flat surface of said flange.

5. The connecting arrangement of claim 1, wherein said groove is formed entirely in said flat surface of said flange.

6. A connecting arrangement for connecting an end of a fluid line to an assembly to be supplied with fluid, the connecting arrangement comprising:
- a stub defining a longitudinal axis and having a through-flow opening configured to receive the fluid line at one end thereof;
- a flange defining a first opening defining an inner bore configured to receive said stub therein and conjointly defining an interference fit therewith and said flange also having a second opening configured for fixing said flange on the assembly;
- said stub being inserted into said first opening of said flange and being connected thereto material-to-material in a firmly bonded manner via a solder connection;
- said flange having a flat surface extending perpendicularly to said longitudinal axis of said stub and in contact with a flat surface of said stub to define an interface;
- said flange having a groove formed in said flat surface of said flange so as to run in a peripheral direction around and radially spaced from said first opening in the region of said solder connection; and,
- wherein the solder for making said solder connection is applied to said inner bore and said groove being formed at said interface and configured to collect excess solder therein and to break down a capillary action of said excess solder thereby preventing a flow of said excess solder from said groove.

* * * * *